(No Model.)
G. A. LONG.
SAW HANGING.
No. 307,665. Patented Nov. 4, 1884.
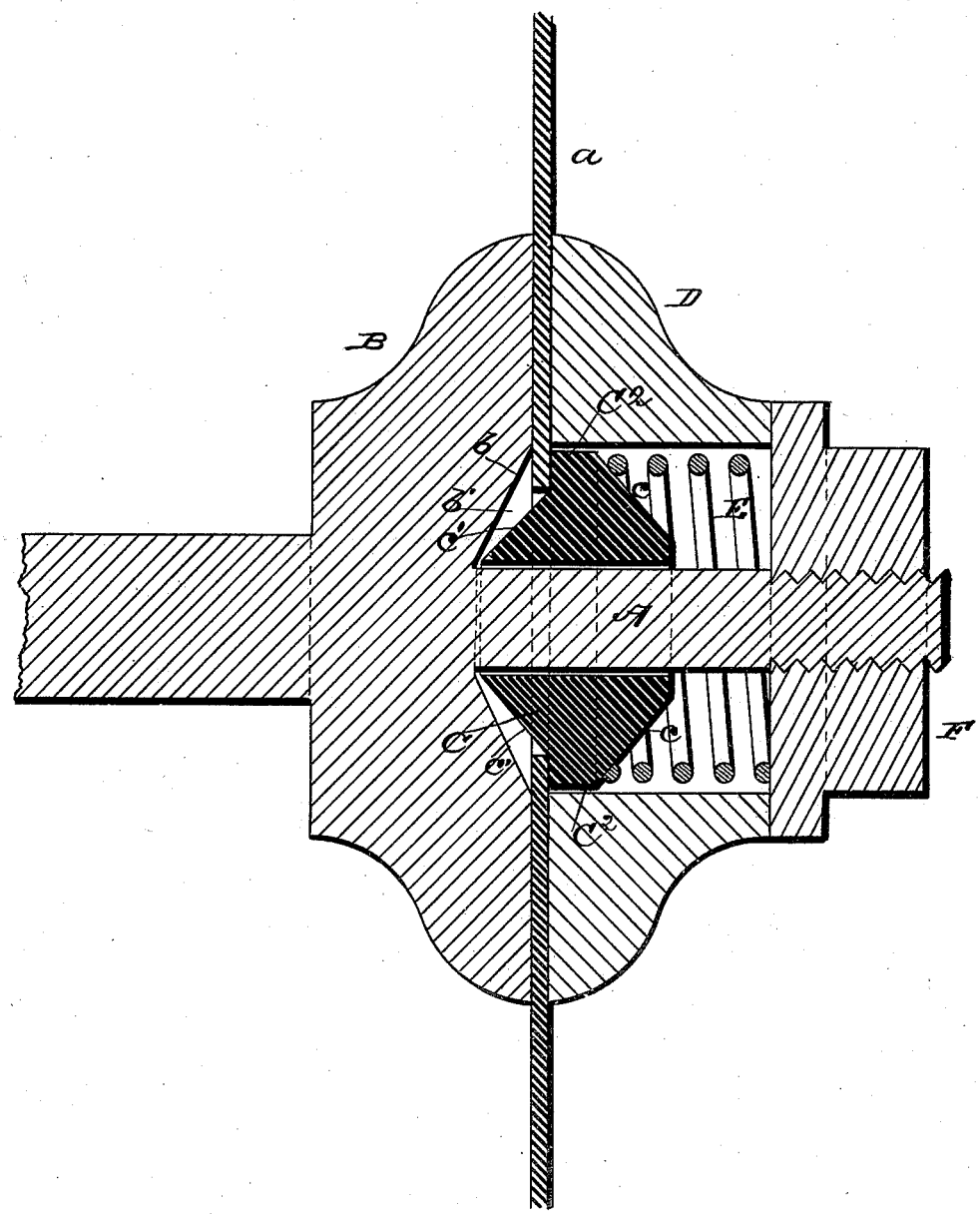
WITNESSES
INVENTOR
Geo. A. Long
by Anderson & Smith
his ATTORNEYS

UNITED STATES PATENT OFFICE.

GEORGE A. LONG, OF NORTHFIELD, MASSACHUSETTS.

SAW-HANGING.

SPECIFICATION forming part of Letters Patent No. 307,665, dated November 4, 1884.

Application filed August 22, 1884. (No model.)

*To all whom it may concern:*

Be it known that I, GEORGE A. LONG, a citizen of the United States, residing at Northfield, in the county of Franklin and State of Massachusetts, have invented certain new and useful Improvements in Centering and Bushing Devices; and I do declare the following to be a full, clear, and exact description of the invention, such as will enable others skilled in the art to which it appertains to make and use the same, reference being had to the accompanying drawing, and to letters or figures of reference marked thereon, which form a part of this specification.

The figure of the drawing is a vertical longitudinal section of the device.

This invention relates to that class of devices whereby circular saws or other tools rotating on shafts are secured and centered upon the said shafts; and its object is to construct means for rendering the said securing and centering easy of accomplishment and practically automatic, so that they can be performed by any one as easily as by a skilled mechanic. In the usual method of centering or rendering the saw or other tool concentric with its shaft, bushes have been fitted in the eye of the saw around the shaft with a great degree of exactness, else there is inconvenience from heating, from the saw buckling, and from various causes. There is also danger of bursting or breaking, more especially in the case of a large emery-wheel.

The invention prevents all these inconveniences and dangers, and essentially consists in making the bushing-ring with a concentrically-beveled edge, which, when the parts are fitted together on each side of the saw, is driven gradually in the eye of the same, thus bushing and centering it in a manner hereinafter more fully explained.

In the accompanying drawing, A is the shaft of a circular saw, $a$, or other tool which has to be fixed concentrically upon a shaft.

B is a collar, of the usual or other proper shape, fixed upon the shaft, and having that part of its surface $b$ (adjacent to the saw) which lies immediately around the shaft beveled downwardly, so as to form a groove or depression, $b'$, around the shaft, for a purpose hereinafter explained.

C is a bushing-ring fitting snugly over the shaft A. The ring or bush C has both of its edges beveled at $c$ and $c'$, respectively, the beveled part at $c$ being of greater diameter than that at $c'$, in order to enter and bind in a hole or eye of greater diameter.

$c^2$ is a shoulder on the periphery of the bush C, which shoulder separates the parts $c$ and $c'$. The bush may be reversed on the shaft, and either of the ends $c$ or $c'$ may enter the groove $b'$ when the saw is fixed in place.

D is a loose collar, similar in general shape to the collar B, but having a bore of sufficiently greater diameter than that of the shaft A to permit a coil-spring, E, to pass through around the shaft and have its inner end abut against the end of the bush-ring C. The outer end of said spring is driven inward and the spring compressed by a nut, F, that screws on the shaft A and drives the loose collar against the surface of the saw. The pressure of the nut against the spring drives the beveled end of the bush into the eye, and thus centers the same and makes it concentric with the shaft. If desired, the spring may be omitted and the bush furnished around its periphery with an external thread screwing into an internal thread on the bore of loose collar. In this case the motion of the loose collar carries the bush into the eye of the saw, and as the bush is beveled only on one side it cannot be reversed.

The method of fastening and automatically centering a saw or other tool on the shaft is as follows: The shaft being of smaller diameter than the eye of the saw, the latter is passed over the former, hanging loosely thereon and resting against the collar B. The beveled edge or end of the bush-ring C is then inserted in the eye, the spring E put in place, the loose collar placed over the spring, and the nut screwed home. The bevel as it enters brings the edge of the saw concentric with the shaft, and the pressure of the two collars against the opposite surfaces of the saw binds the latter on the shaft.

Having thus described my invention, what I claim, and desire to secure by Letters Patent, is—

1. The combination, with a circular saw and its shaft, of the collars B and D, the ring having its opposite ends beveled to enter the eye of the saw, the bevel at one end being of a greater diameter than that at the opposite end, and means, substantially as described, for operating the same, whereby saws of various sizes may be centered by the same ring, as set forth.

2. As an improved article of manufacture, a centering-ring for circular saws having its opposite ends beveled or inclined to enter the eye of a saw, the bevel at one end being of a greater angular inclination than that at the opposite end, whereby saws of various sizes may be centered, substantially as specified.

In testimony whereof I affix my signature in presence of two witnesses.

GEORGE A. LONG.

Witnesses:
ROLLIN C. WARD,
LAURA L. POMEROY.